United States Patent [19]

Orr

[11] Patent Number: 5,797,386
[45] Date of Patent: Aug. 25, 1998

[54] PORTABLE COOKING DEVICE

[76] Inventor: Max Stroble Orr, 4917 Woodfield Dr., Carmel, Ind. 46033

[21] Appl. No.: 855,180

[22] Filed: May 13, 1997

[51] Int. Cl.⁶ ........................................... F24B 3/00
[52] U.S. Cl. ................. 126/25 R; 126/25 A; 126/9 R; 126/9 B
[58] Field of Search ................... 126/25 R, 26, 126/25 A, 9 R, 9 B

[56] References Cited

U.S. PATENT DOCUMENTS

| | | | |
|---|---|---|---|
| 3,051,159 | 8/1962 | Hardy | 126/25 A |
| 4,909,235 | 3/1990 | Boetcker | 126/9 R |
| 5,218,950 | 6/1993 | Hait | 126/25 R |

*Primary Examiner*—Carroll B. Dority
*Attorney, Agent, or Firm*—Woodard, Emhardt, Naughton, Moriarty & McNett

[57] ABSTRACT

A portable cooking device is disclosed that includes a main housing having an open top and an insulation layer attached to the inner surface of the main housing, a burner housing having an insulation layer attached to the outer surface of the main housing, and wherein the burner housing is disposed within the burner housing to define an air passage between the main housing and the burner housing. The base of the burner housing includes a plurality of apertures. The main housing includes a plurality of apertures near its upper edge. Air flows through the apertures of the main housing down through the air passage and into the apertures at the base of the burner housing. A cooking grate is disposed on top of the burner housing. The cooking grate and the burner housing include mounting features that provide two additional distinct cooking heights. The cooking grate includes a cooking surface offset from its mounting ring which permits the grate to be turned upside down and achieve two distinct cooking heights. Apertures in the mounting ring and mating mounts atop the burner housing enable the grill to be disposed at one of two additional heights over the burner housing. A flue is located in the air passage between the main housing and the burner housing to regulate air flow to the base of the burner housing. Cooking vessels are removably insertable in place of the cooking grill to provide greater cooking flexibility.

21 Claims, 7 Drawing Sheets

5,797,386

PORTABLE COOKING DEVICE

FIELD OF THE INVENTION

This invention relates in general to cooking devices, and more particularly to portable cooking devices that use charcoal, wood, devolatilized coal or the like as a source of fuel.

BACKGROUND OF THE INVENTION

Portable cooking devices such as outdoor grills and hibachis are well known and enjoy great popularity. Most such devices include a basin within which a fuel such as charcoal or wood is placed. The charcoal or wood is ignited and a cooking grill or grate is placed over the burning fuel. Food of endless varieties is placed on the grate and cooked as desired.

One significant shortcoming in cooking devices of the prior art is an extremely inefficient design, wherein a large portion of the radiant heat energy generated by the fuel is lost into the atmosphere. Another significant drawback of portable cooking devices of the prior art is heat transfer to the outer grill basin or housing that creates a burn hazard for the user. Another by-product of this 'inherent' inefficiency of known, prior art grills is that the inefficiency of their air flow characteristics limit the types of fuels that can be burned in the grills. For example, low-volatile fuels such as devolatilized coal will not burn well in known, inefficient prior art grills.

Many known, portable, cooking devices also suffer the drawback of being relatively inflexible in their ability to accommodate cooking vessels such as pots and pans. Such vessels are easily dislodged from atop known portable cooking devices. Further, the control of the cooking temperature within such vessels is limited or non-existent with known, prior art grills.

In view of the shortcomings noted in portable cooking devices of the prior art, a more efficient, flexible and more safe design is needed.

It is therefore one object of the present invention to provide an improved portable cooking device.

Another object of the present invention is to provide a portable cooking device that is significantly more fuel efficient than such devices of the prior art, and which can accommodate fuels such as devolatilized coal.

SUMMARY OF THE INVENTION

According to one aspect of the present invention, a portable cooking device comprises a main housing having a main base and main side walls extending upward from and surrounding the base. The sidewalls include a plurality of apertures therein which are located at distal points from the main base. A burner housing includes a horizontal burner grate having a plurality of holes therein. The burner housing also includes burner sidewalls that enclose the burner grate and extend upward and downward from the burner grate, a burner floor placed at the base of the burner side walls, and a handle that is pivotally attached to the burner housing. The burner housing is disposed within the main housing to define an air flow passage between the main housing and the burner housing, and grate support means as provided for supporting a cooking grate in a horizontal position over the burner housing. The grate support means is attached to the burner side walls. Flue means are disposed within the air flow passage and between the apertures in the main side walls and the holes in the burner side walls, the flue means restricts air flow between the apertures in the main side walls and the holes in the burner side walls.

One feature of the present invention is that a portable cooking device includes a counter-flow air supply path. One advantage of this counter-flow air supply path is that it provides cooling to the outer surfaces of the cooking device. Another advantage of this counter-flow air supply is that it provides a longer airflow path, which helps to generate a greater airflow velocity and volume through the device. This greater air flow velocity helps to enable the device to burn fuel more efficiently, and also enables the device to burn fuels, such as devolatilized coals, which cannot be burned in known, conventional grill units. As cool air travels down to the entrance of the burner (18) and passes through the openings (20), it warms up prior to combustion and cools the sides. When the combustion air meets the fuel, it is at its greatest velocity due to the venturi shape of the burner cone.

Another feature of the present invention is that it includes a cooking grate, and a grate support means for supporting the cooking grate in a horizontal position over a burner housing. The grate support means and cooking grate are cooperable positionable so that the cooking grate can be placed in one of at least three or four different cooking positions, each one at a different distance from the burning fuel. This feature has the advantage of enabling the user to vary the cooking temperature of the material within the cooking vessel, thus enabling the user to better control his cooking rate and cooking temperature.

Another feature of the present invention is that it includes a burner housing equipped with burner side walls, a burner floor, and a handle. These features allow the burner housing to catch and trap ash as the fuel source burns, thereby enabling swift and simple disposal of the ash between each cooking cycle.

A further feature of the present invention is that a flue means is disposed within the airflow passage, which includes means for restricting the airflow in the airflow path. This flue means has the advantage of enabling the user to control the air flow through the air flow passage, to thereby help to control the rate at which the fuel burns, and help to control the burner temperature, and ultimately, the speed at which the burner cooks the food that is placed upon the cooking grate or a vessel held by the grate.

These and other objects, advantages, and features are accomplished according to the following description of the preferred embodiment of the present invention.

3

Figure 4:
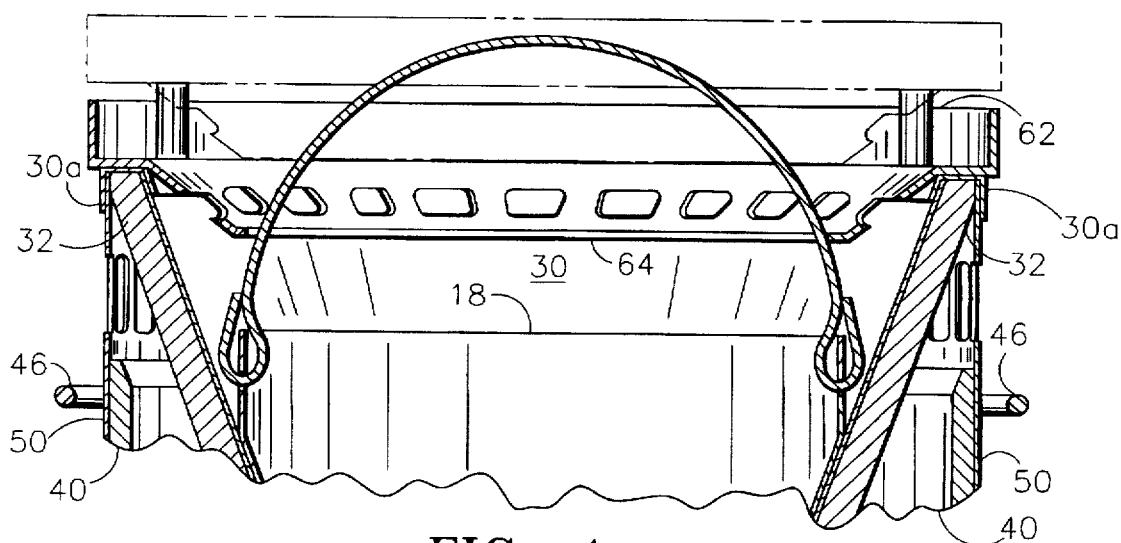
FIG. 4 is a partial cross-section of an alternative embodiment cooking device of the present invention depicting the cooking grate in a first position (in solid) and a second position (in shadow).
Figure 6:
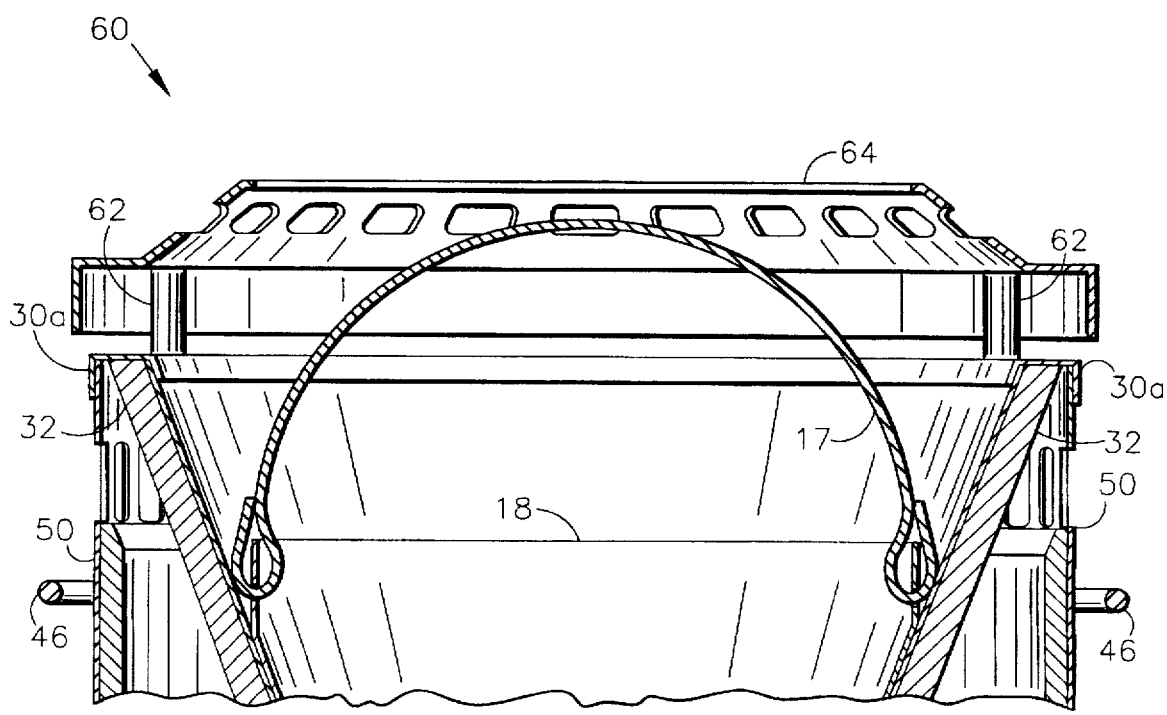

FIG. 6 is a partial cross-section of the device of FIG. 4 depicting the cooking grate in a fourth position.

Figure 7:
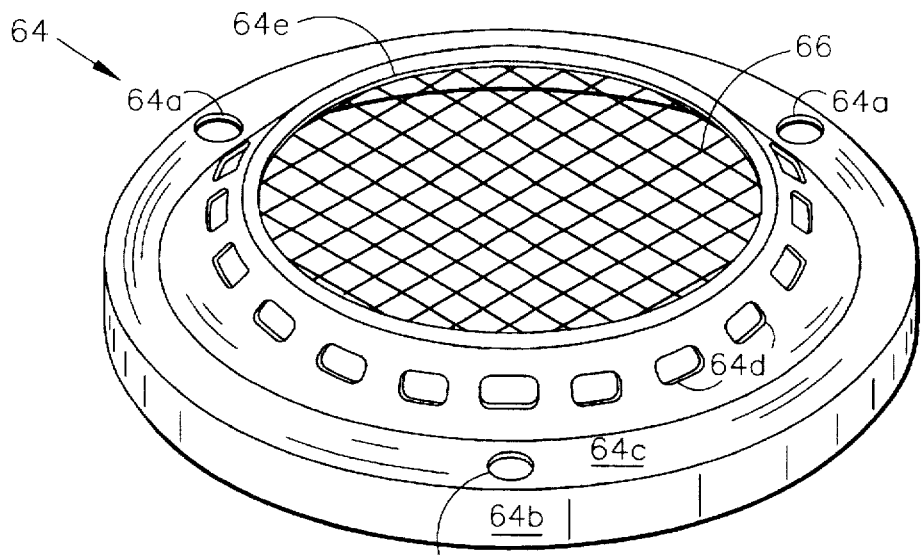

FIG. 7 is a perspective view of the alternate design for a cooking grate also shown in FIG. 4.

Figure 8:
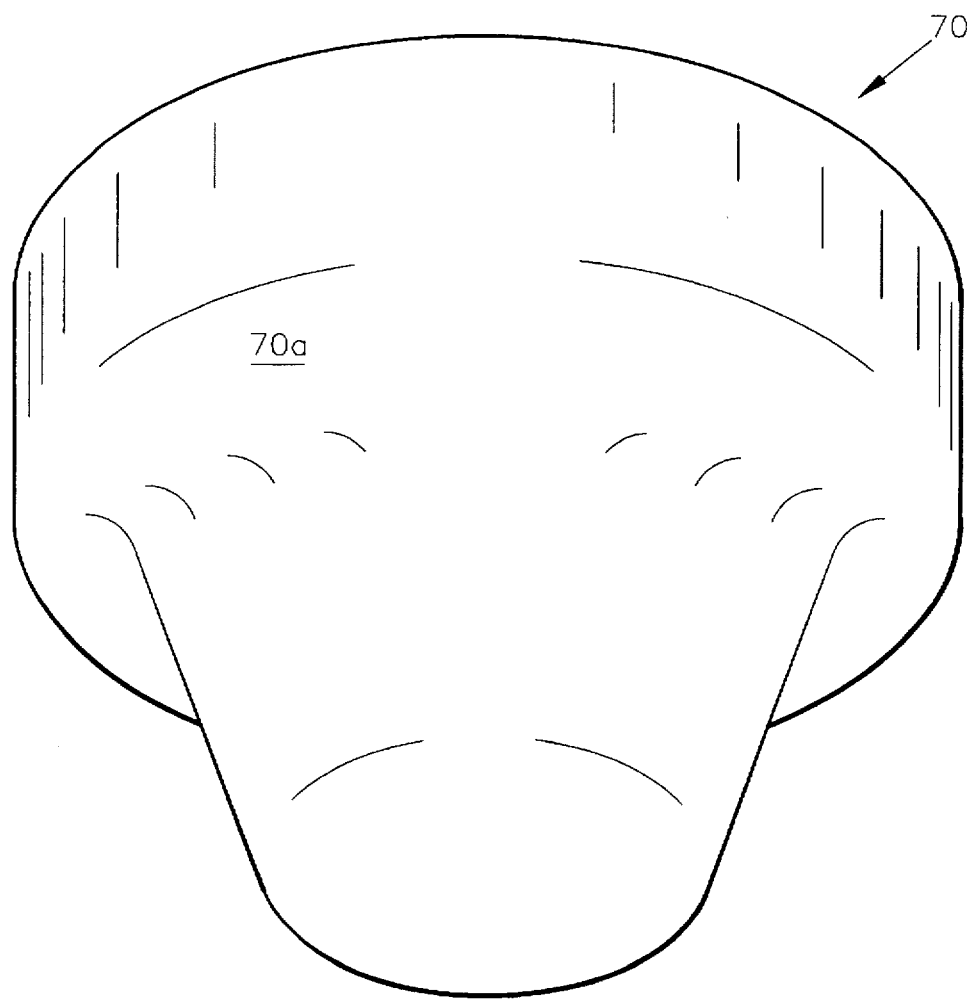

FIG. 8 is a perspective view of a cooking vessel that is used in conjunction with the portable cooking device of FIG. 4.

Figure 9:
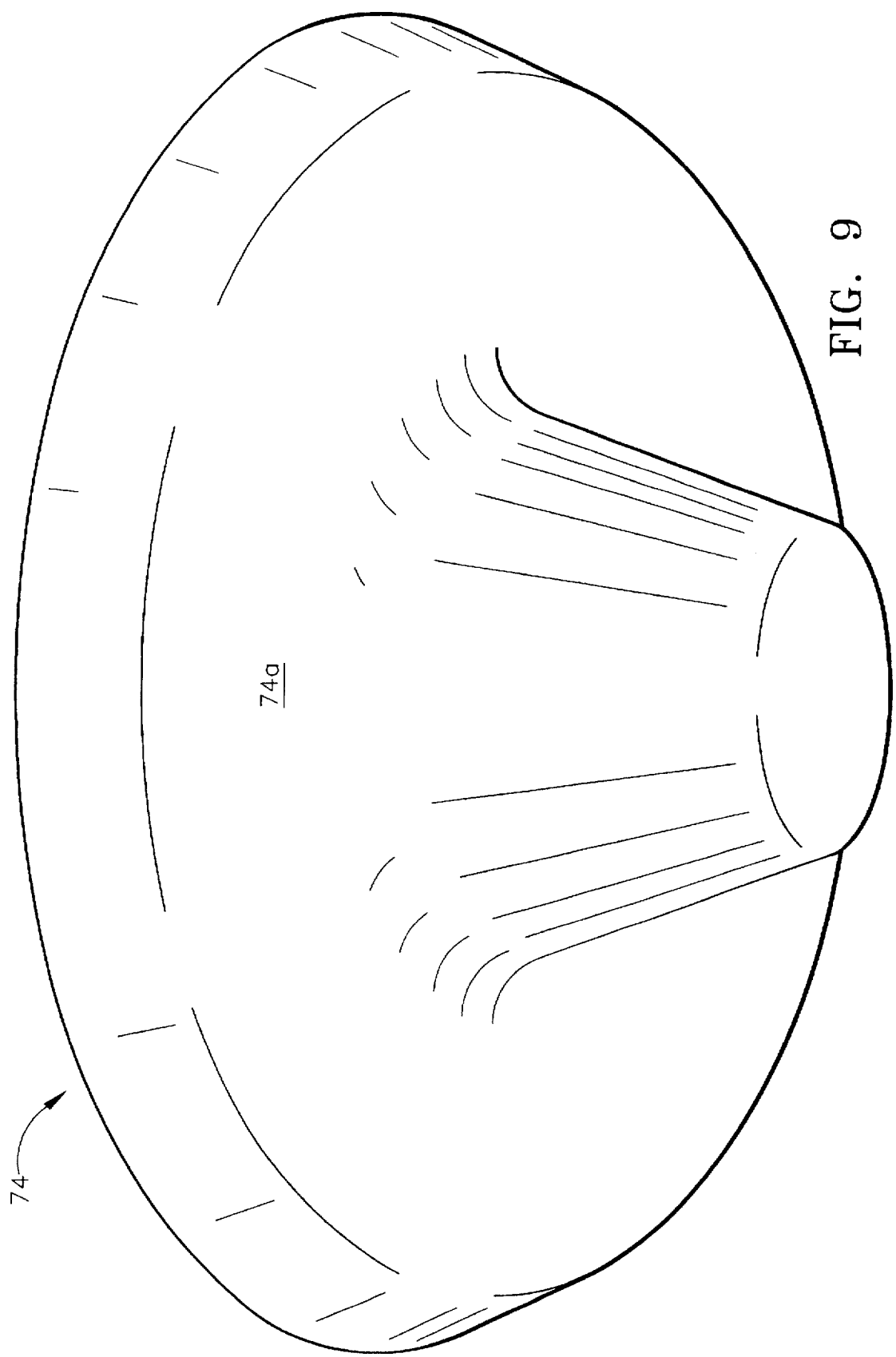

FIG. 9 is a perspective view of another cooking vessel that is used in conjunction with the portable cooking device of FIG. 4.

Figure 10:
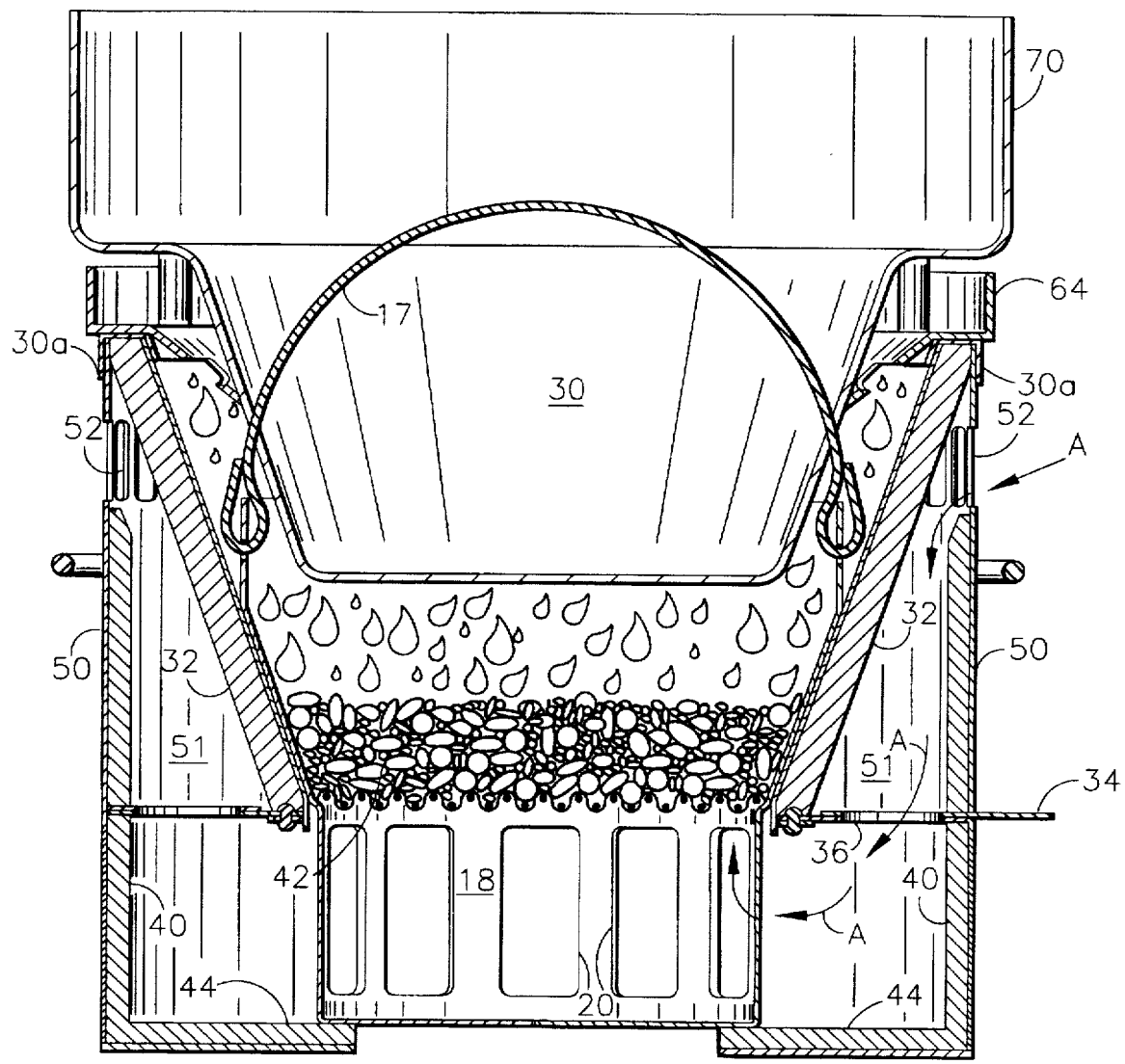

FIG. 10 is a cross section of the cooking device of FIG. 4 depicting the counter-flow movement of air within the air passage defined by the main housing and the burner housing.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
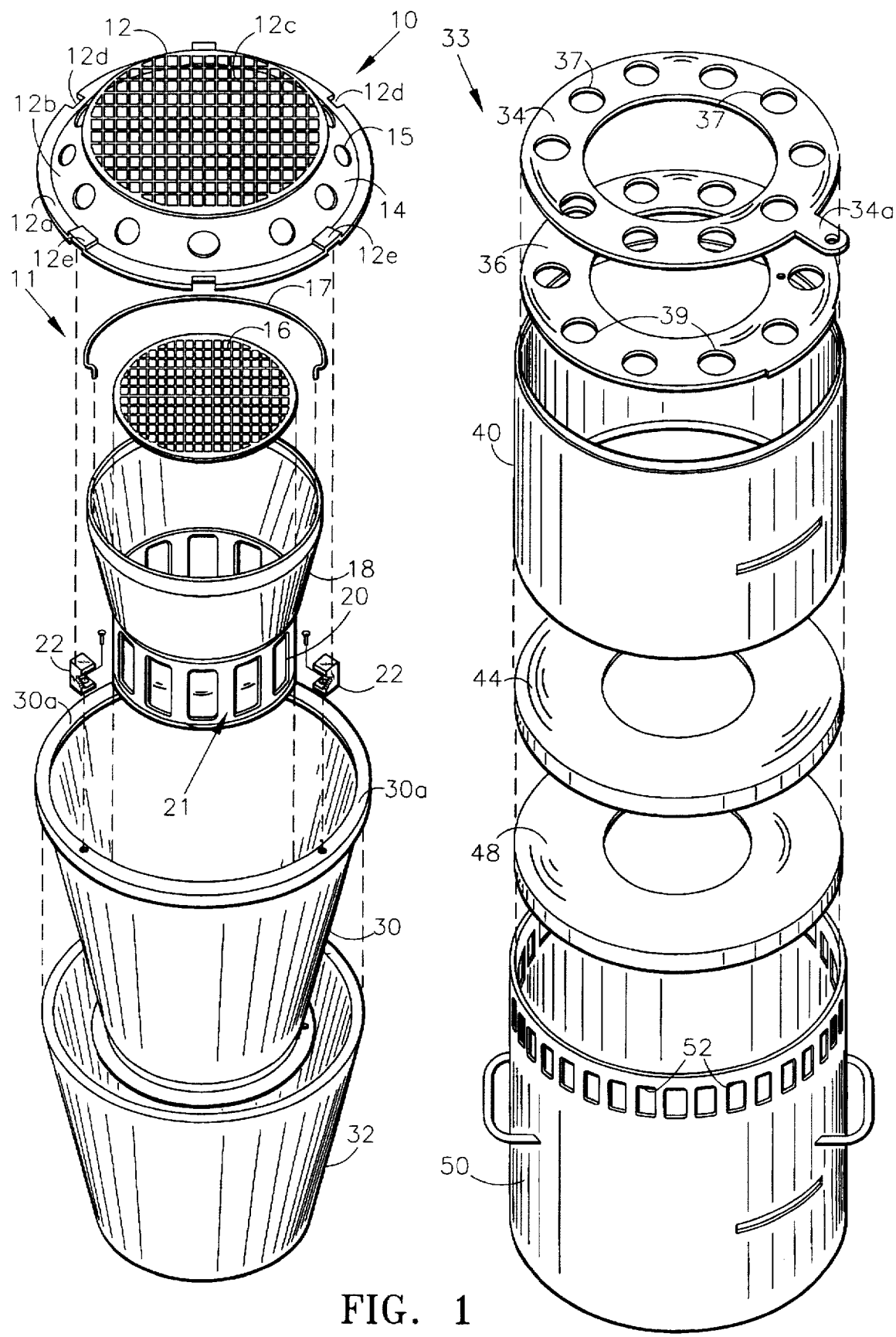
FIG. 1 is an exploded view of the portable cooking device of the present invention.
Figure 2:
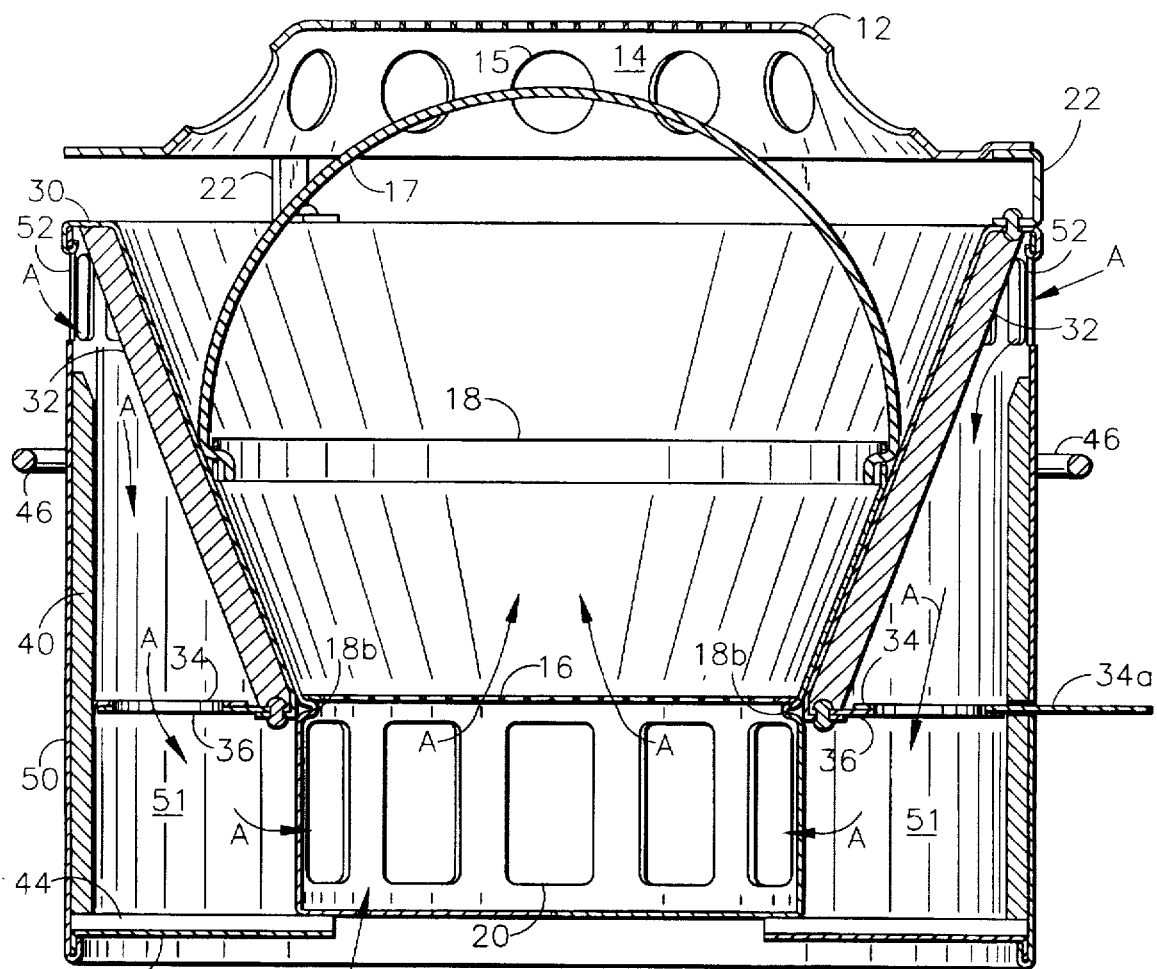
FIG. 2 is a partial cross-section of the device of FIG. 1 depicting the insulation layer locations and the cooking grate in a first position.

Referring now to FIGS. 1 and 2, a portable cooking device 10 of the present invention is shown. FIG. 1 is an exploded view of the components of device 10 and FIG. 2 is a partial, cross-sectional view of device 10. Device 10 includes two primary assemblies: a burner assembly 11 and a main housing assembly 33. The burner assembly 11 is comprised of a cooking grate or grill 12 for holding the food to be cooked, a fuel grate 16 for holding the fuel to be burned, an inner burner hosing 18, a handle 17 that is pivotally attached to housing 18, a frusto-conically shaped outer burner housing 30, and a frusto-conically shaped insulation member 32. Burner housing 18 includes a generally cylindrically shaped base portion 21 having a circumferential array of apertures 20 therein. Base portion 21 further comprises a burner floor 21a that encloses the bottom of inner burner housing 18. Inner burner housing 18 also includes a frusto-conical portion 23 disposed above the base portion 21. The frusto-conical portion 23 is sized for being received adjacent to the conical inner surface of the outer burner housing 30.

Cooking grate supports 22 (of which there are three spaced in equiangular positions and one is not shown) are attached at locations 30a on the upper edge of outer burner housing 30. Outer burner housing 30 is disposed within insulation member 32. Insulation member 32 is formed to snugly receive the conical outer surface of burner housing 30. Inner burner housing 18 is disposed within outer burner housing 30 such that the conical surface 23 is set apart from the inner surface of burner housing 30 by a small air gap.

Fuel grate 16 rests upon a ridge 18b formed in burner housing 18. Cooking grate or grill 12 rests atop supports or mounting brackets 22. Cooking grate 12 includes an outer ring 12a, a conical surface 12b, and the grate or grill 12c upon which food is placed. Grill member 12c is preferably designed to be separate from the remainder of cooking grate 12, so that an aperture is formed for receiving a pot or wok such as is shown in FIGS. 8-10.

Conical surface 12b also includes a number of airflow apertures 15. Cooking grate 12 also includes notches 12d in three locations about the periphery of the ring 12a. Mounting tabs 12e are formed from the outer ring 12a and offset a predetermined distance from the plane in which ring 12a resides.

Main housing assembly 33 includes a generally cylindrical main outer housing 50, a washer-shaped base 48, a correspondingly washer-shaped insulation disk 44, an insulation cylinder 40 sized to be received adjacent to the interior surface of the main outer housing 50, and flue grates 36 and 34. Base 48 is attached to the lower edge of housing 50. Insulation disk 44 rests atop base 48. Insulation cylinder 40 is disposed within housing 50 and is shaped to coincide with the internal walls of housing 50. Flue grates 36 and 34 are disposed horizontally within housing 50 with flue grate 34 being rotationally, slidably movable in a direction defined by slots 40a and 50a wherein tab 34a is inserted, which direction is generally rotational about an axis defined by the cylindrical housing 50. The inner diameter of flue grate 36 is attached to inner burner housing 18 at vertical location just above apertures 20. Flue grate 34 rests upon grate 36 and is rotatably movable with respect thereto. Flue grate 34 and flue grate 36, each include a plurality of apertures, 37, 39, respectively, which are movable into and out of alignment through the movement of the grate 34 relative to flue grate 36. When the apertures 37, 39 are in alignment, the apertures 37, 39 allow more air to pass therethrough. Conversely, when the apertures 37, 39 allow more air to pass therethrough. Conversely, when the apertures 37, 39 are partially or fully misaligned, less air can flow through the aperture. Main housing 50 includes a plurality of apertures 52 about the periphery of the housing near the upper edge thereof. Handles 46 are attached to main housing 50 on opposing sides thereof.

Cooking grate 12 is shown in FIGS. 1 and 2 in a first position or cooking height, of which four are possible with the features of the device 10. In the first position, cooking grate 12 is rotated so that the mounting tabs 12e are aligned with the grate supports 22. The tabs 12e positively receive the grate supports 22 so that the grate 12 cannot be rotated without raising the grate 12 above the indentation depth of the tabs 12e.

In operation, a fuel source such as charcoal, wood, or devolatilized coal (not shown) is placed atop grate 16 and is ignited. Handle 34a of flue grate 34 is adjusted to vary the airflow supplying fuel to the fire above grate 16. Air flow to the fire is delivered along path "A" through apertures 52, flowing downward between insulation layers 40 and 32, and through apertures 20 to the underside of the fire located on grate 16. Air flowing in the passageway 51 along the path shown by the arrows labeled "A", and defined by insulation layers 40 and 32, helps reduce the temperature of the main housing 50.

As the fuel source combusts and forms ash particles, these particles fall through the grate 16 to the burner floor 21a. Then, upon completion of the cooking cycle, a user may remove cooking grate 12 and grate 16 and grasp handle 17 in order to lift inner burner housing 18 from outer burner housing 30. This combination of features makes the removal and disposal of ash particles from the portable cooking device 10 clean and simple.

In order to prevent failure of the structural materials at very high temperatures, approximately 1300°, it is recommended that the burner housing 18 and the conical housing 30 be constructed of stainless steel. It is also recommended that stainless steel of grade 300 or higher be used. This prevents rust and is more corrosion resistant than common mild steels and lower grade stainless steels. A high grade of insulating material is used for the insulation members 32, 44, and 40. A ceramic fiber mat or formed material is preferred for the insulating layers 32, 44, and 40. The use of ceramic fibers in such materials is key to the success of controlling the efficient use of heat within the cooking device 10. It should be noted that the burner floor 21a of the inner burner housing 18 rests directly on the upper surface of the insulation 44. This is necessary to seal the air supply so that the air route comes from openings 52 through the adjustable flue and into the burner.

Figure 3:
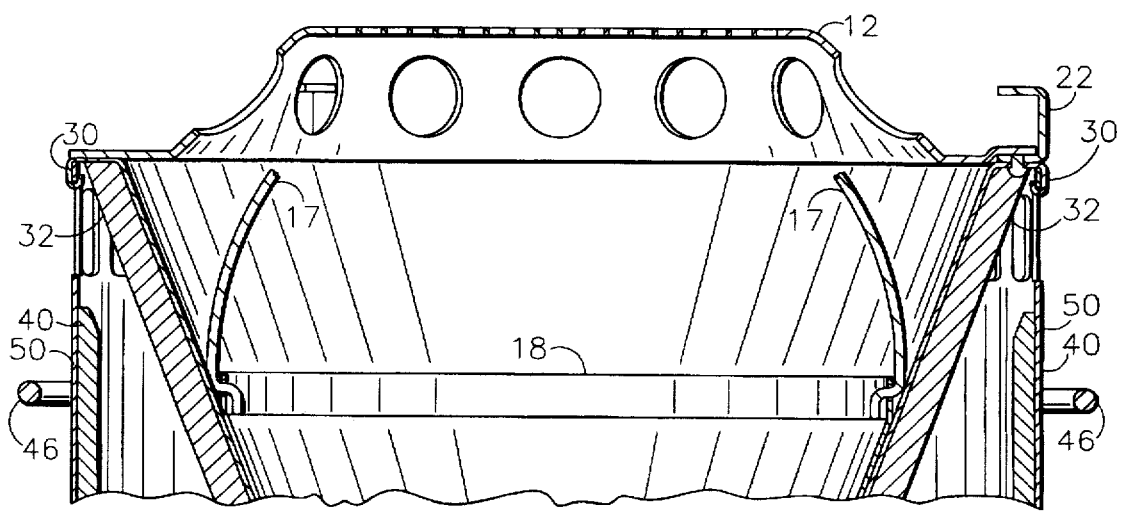
FIG. 3 is a partial cross-section of the device of FIG. 1 depicting the cooking grate in a second position.

Referring now to FIG. 3, a partial cross-section of the portable cooking device 10 is shown, wherein the cooking grate 12 is placed in a second position or height wherein the slots of 12d of cooking grate 12 are rotationally aligned with the grate supports 22. In this configuration, a second distinct cooking height is achieved, wherein the grill member 12c is placed relatively closer to fuel grate 16, than at 12c is when the first position, as shown in FIG. 2. Also shown in FIG. 3 are the following: inner burner housing 18, handle 17, outer burner housing 30, insulation 32, insulation 40, main housing 50, and handles 46.

Figure 3A:
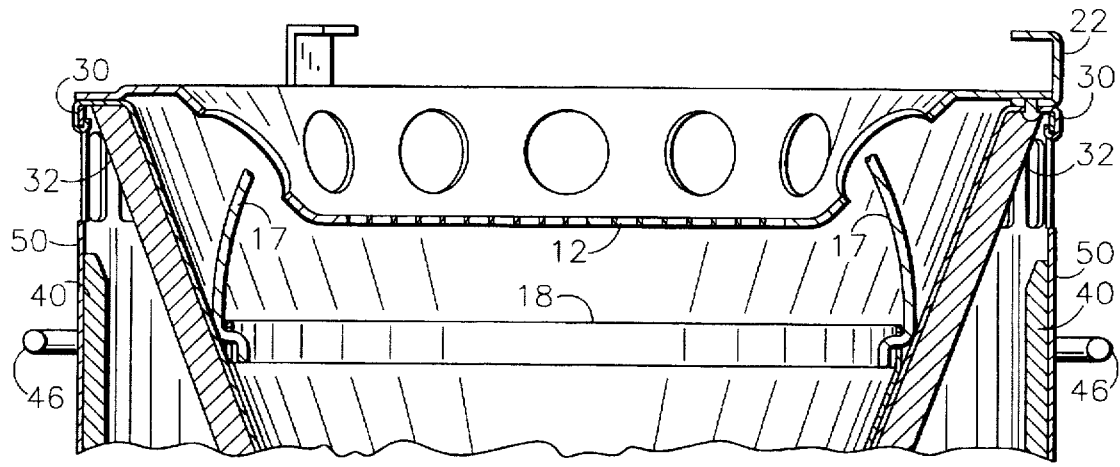
FIG. 3a is a partial cross-section of the device of FIG. 1 depicting the cooking grate in a third position.

Referring now to FIG. 3a, a partial cross-section of the portable cooking device 10 of the present invention is shown. FIG. 3a depicts the cooking grate 12 in a third position or height wherein the slots of 12d of cooking grate 12 are rotationally aligned with the grate supports 22. Cooking grate 12 is horizontally inverted (as compared with the orientation shown in FIG. 2). In this configuration, a third distinct cooking height is achieved which comprises a closer placement of the grill member 12c to the source of heat, than is achieved in either the first (FIG. 2) or second (FIG. 3) positions. Also shown in FIG. 3 are the following: inner burner housing 18, handle 17, outer burner housing 30, insulation 32, insulation 40, main housing 50, and handles 46.

Figure 3B:
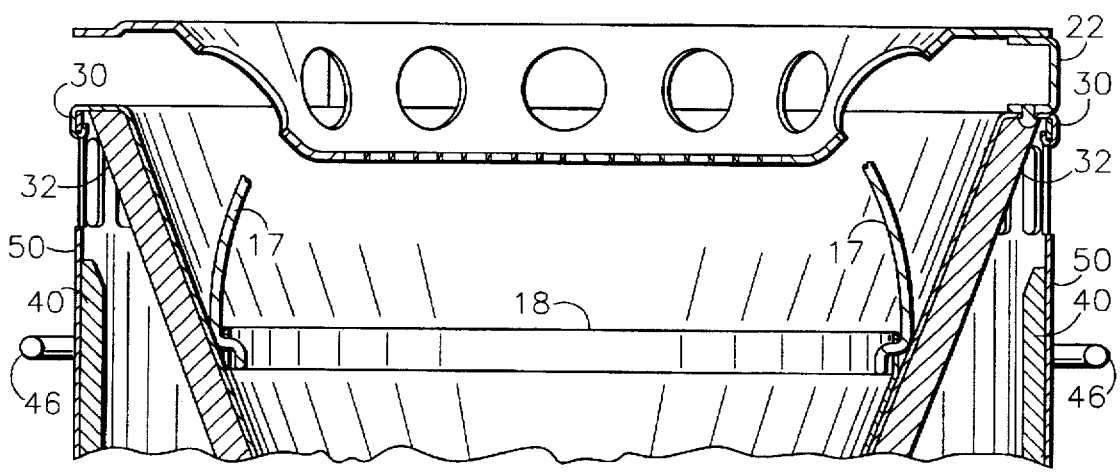
FIG. 3b is a partial cross-section of the device of FIG. 1 depicting the cooking grate in a fourth position.

FIG. 3b comprises a partial cross-section of the portable cooking device 10 wherein the cooking grate 12 is shown in a fourth position or height. In the fourth position the grate supports 22 contact the outer ring 12a of grate 12 to provide vertical support for grate 12. Grate 12 is relatively stable in this position as the supports 12 will contact the conical surface 12b (see FIG. 1) of grate 12 if lateral movement of grate 12 is attempted. In this configuration, a fourth distinct cooking height is achieved. In this fourth position, the grill 12c is place closer to the heat source than in any of the first, second or third positions discussed above. Also shown in FIG. 3 are the following: inner burner housing 18, handle 17, outer burner housing 30, insulation 32, insulation 40, main housing 50, and handles 46.

Referring now to FIG. 4 and FIG. 7, another embodiment of a portable cooking device 60 according to the present invention is shown. The main housing assembly of device 60 is identical with that of the embodiment of FIGS. 1–3 and identical components are identified with the same item numbers. Handles 46 are attached to the outer surface of main housing 50. Also shown are insulation member 32, insulation member 40, inner burner housing 18, and outer burner housing 30. The above described components are all virtually identical to their counterparts shown in FIGS. 1–3.

However, in this embodiment, grate supports 62 are cylindrical in cross-section. Cooking grate 64, shown in more detail in FIG. 7, includes three apertures 64a which receive supports 62 in two of four height positions achieved with the present embodiment. Outer ring 64b serves to retain grate 64 on top of supports 62 thereby preventing lateral movement thereof when grate 64 is position so that (1) the vertical supports 62 are not aligned with apertures 64a and (2) vertical supports are engaged with the underside of circular surface or ring 64c; so that the ring 64c rests on the top of vertical supports 62.

Grate 64 also includes a grid or grill 66. Apertures of 64d provide an air passage for hot gasses to pass through grate 64, if food resting on the grill 66 entirely covers grill 66. Grill 66 is removably attached to grate 64, and when removed, enables the use of alternative cooking devices such as those shown in FIGS. 8–10, which are described in detail below.

FIG. 4 depicts cooking grate 64 shown in two of the four cooking height positions that are possible with the portable cooking device 60. As with device 10, device 60 can be mechanically configured so that four distinct cooking heights are achieved by inverting and/or rotating cooking grate 64 with respect to the supports 62. A first cooking height (shown in solid) is obtained by aligning supports 62 with the apertures of 64a and placing cooking grate 64 thereon. The first cooking height has the grill 66 placed so that it is positioned below the outer ring 64c, so that the grill is relatively closer to the heat source than the ring 64c. A second cooking height position is achieved with the supports 62 positioned beneath ring 64c (see FIG. 7) and is shown by the broken line (shadow) position of grate 64 in FIG. 4. This second position maintains the grill 66 in a position below the outer ring 64c. However, since the ring 64c of the grate 64 rests upon the top surfaces of the supports 62, the grill 66 is placed relatively further away from the heat source than when the grill 66 is in the first position (shown in solid).

Figure 5:
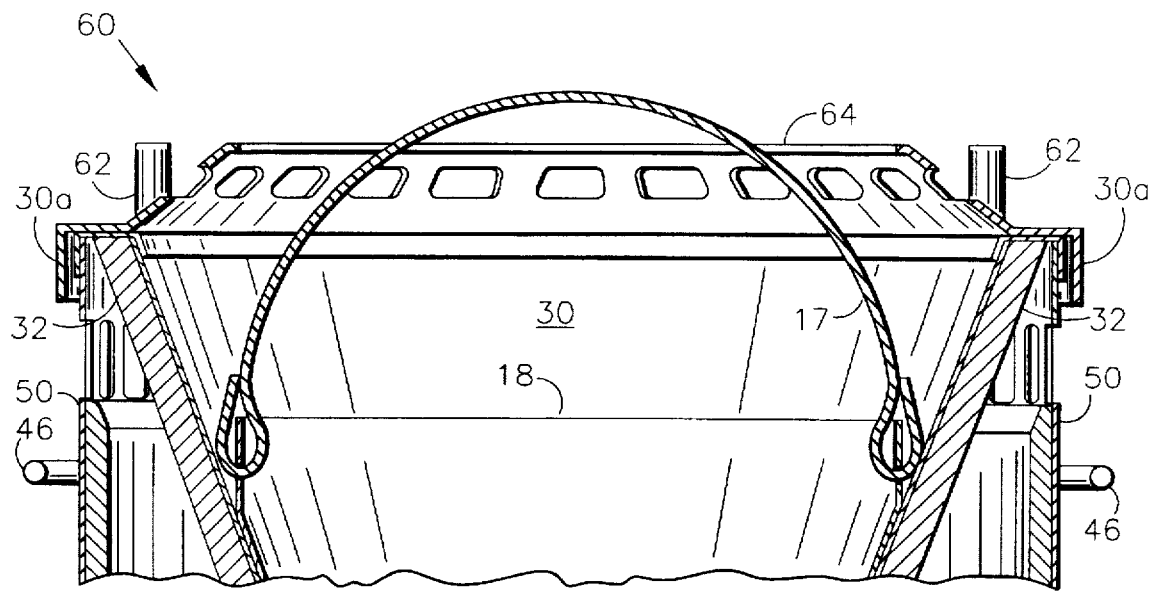
FIG. 5 is a partial cross-section of the device of FIG. 4 depicting the cooking grate in a third position.

Referring now specifically to FIG. 5, a third cooking height for cooking grate 64 is shown. Cooking grate 64 is inverted (with respect to its orientation of FIG. 4) and positioned about supports 62 with apertures 64a (see FIG. 7) receiving supports 62. In the third cooking position, the grill is positioned above the outer ring 64c. In this position the grill 66 is placed relative further from the heat source than it is when in either the first or second positions shown in FIG. 4. Main housing 50, handles 46, handle 17, inner burner housing 18, outer burner housing 30, and insulation 32 are also shown in FIG. 5.

Referring now to FIG. 6, a fourth cooking height of cooking grate 64 for device 60 is shown. Cooking grate 64 is inverted (with respect to its orientation of FIG. 4) and positioned about supports 62 with the underside surface of ring 64c (see FIG. 7) being vertically supported by, and resting on the upper surface of the supports 62. When in the fourth position, the grill 66 is placed relatively farther from the heat source than in any of the first, second or third positions. Main housing 50, handles 46, handle 17, inner burner housing 18, outer burner housing 30 and insulation 32 are also shown in FIG. 6.

Referring now to FIGS. 8 and 10, a cooking pot 70 for use with portable cooking device 60 is shown. Cooking pot 70 is used to cook foods requiring a traditional cooking pot or pan. The inner diameter of ring 70a is slightly smaller than the diameter of opening 64e of FIG. 7. With grill 66 removed form cooking grate 64, pot 70 is removably located within aperture 64e. The cooking temperature of pot 70 is controllable by positioning the cooking grate 64 into one of the four cooking height positions previously discussed and by adjusting the alignment of the apertures 37, 39 of the flue grates 34, 36 to vary air flow. FIG. 10 depicts pot 70 located atop cooking grate 64. Handle 17, outer burner housing 30, insulation 32, insulation 40, insulation 44, inner burner housing 18, and flue grates 34 and 36 are also depicted in FIG. 10 and provide the same functionality as in device 10 of FIG. 1.

As shown in FIG. 10, the arrows labeled "A" identify a counter-flow path that fresh air follows through device 60. Air enters through the relatively upper apertures 52 in main base 50, passes through the apertures 37, 39, flue grates 34 and 36, then passes through apertures 20 in the base 21 of the burner housing, then into the inner burner housing 18 and upwardly through the fuel grate 16 to thereby supply air to fuel 42. Fuel 42 is any of various fuels well known in the art, such as charcoal, wood, paper or petroleum products, or preferably devolatilized coal. The walls of main housing 50 are maintained at a lower temperature by the cooling effect of fresh air passing through air channel 51 and by the high temperature insulation provided by insulation 32, 40 and 44.

Referring now to FIG. 9, another cooking pot 74 for use with device 60 is shown. Cooking pot 74 includes a large diameter ring 74a (larger in diameter than ring 70a) that is useful to keep foods warm without further cooking thereof. The inner diameter of rim or ring 74a, as with ring 70a, is slightly smaller than the opening 64e so that pot 74 is received into the opening 64e. Functionally, the broad rim or ring 74a of pot 74 provides a warming area similar to that found with a wok cooking pan and captures heat as convection carries the hot gases upon along the wok walls and flat warming area. Food may be moved to the outer areas of rim 74a where the temperatures are lower and the food can be kept warm without undesirable over-cooking.

Cooking pots 70 and 74 are preferably made of alloy metal, such as steel or stainless steel, although other materials well known in the art of cooking devices are contemplated, including aluminum or other alloys suitable for use in high temperature cooking applications.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A portable cooking device comprising:
   a main housing having a main base and main side walls extending upward from and surrounding said base, said side walls including a plurality of apertures therein located at distal points from said main base;
   a burner housing including a horizontal burner grate having a plurality of holes therein, said burner housing further including burner side walls enclosing said burner grate and extending upward and downward from said burner grate, said burner side walls including apertures located below said burner grate, and wherein said burner housing is disposed within said main housing to define an air flow passage between said main housing and said burner housing;
   a cooking grate;
   grate support means for supporting said cooking grate in a horizontal position over said burner housing, said grate support means attached to said burner side walls; and
   flue means disposed within the air flow passage and between the apertures in said main side walls and the holes in said burner side walls, said flue means restricting air flow between the apertures in said main side walls and the holes in said burner side walls.

2. The device of claim 1 wherein said grate support means includes at least three protruding members that extend above said burner side walls and wherein said cooking grate includes three apertures that corresponds with the geometric location of said protruding members, and wherein in a first position said cooking grate is horizontally disposed on said protruding members with said protruding members extending into the cooking grate apertures and in a second position said grate is positioned so that said protruding members are located adjacent the apertures and directly supporting said cooking grate in a horizontal position above said burner housing.

3. The device of claim 2 wherein said cooking grate is comprised of an outer disk, a cooking grill and an inner disk, wherein said outer disk is attached to said inner disk by a connecting member, wherein said outer disk and said inner disk are disposed in parallel planes, said cooking grill is a circular disk having a plurality of holes therein and attached to said inner disk, and wherein said planar outer disk includes the three apertures.

4. The device of claim 3 including first insulation means attached to the outer surface of said burner housing for insulating said burner housing.

5. The device of claim 4 including second insulation means attached to the inner surface of said main housing for insulating said main housing, and wherein said first insulation means and said second insulation means define the air flow passage between said main housing and said burner housing.

6. The device of claim 5 wherein said flue means includes means for variably controlling air flow in the air flow passage.

7. The device of claim 6 wherein said first insulation means is cylindrical in cross-section, and said second insulation means is cylindrical in cross-section, and wherein said flue means is comprised of a first ring having an inner diameter corresponding to the outer diameter of said first insulation means and an outer diameter corresponding to the inner diameter of said second insulation means, said flue means further including a second ring disposed adjacent said first ring and having an inner diameter and an outer diameter substantially identical to the inner diameter and outer diameter of said first ring, and wherein said first and second rings include a plurality of apertures situated so that the apertures in said first ring align with the apertures of said second ring permitting maximum air flow in the air passage, and wherein said first and second rings restrict all air flow in the air passage when said first ring is rotated with respect to said second ring and the apertures of said first and second rings are misaligned.

8. The device of claim 6 wherein said cooking grill is removably attached to said inner disk of said cooking grate, and including:
   a cooking vessel having a circular base cylindrical walls extending upward from said base; and
   wherein said cooking grill is adapted to be removed and said cooking vessel disposed within the aperture defined by the removal of said cooking grill.

9. The device of claim 1 wherein the cooking grate includes an engaging means for engaging the grate support means, and a central aperture for receiving a pot-like cooking vessel.

10. A portable cooking device comprising:
    a cylindrical housing having a circular base and cylindrical side walls extending upward from said base, and wherein said cylindrical side walls include a plurality of apertures near the upper edges thereof;
    a burner housing having a burner floor and a substantially cylindrical cross-section that is open at the top thereof, and including a fuel grate having a plurality of apertures therein, said fuel grate disposed within and between the top and bottom of said housing, said cylindrical housing having a plurality of apertures located below said fuel grate, and wherein said burner housing is disposed within said cylindrical housing and defines an air passage between said burner housing and said cylindrical housing;

a flue disposed in the air passage defined by said burner housing and said cylindrical housing, said flue including a first flue disk having a plurality of apertures therein and a second flue disk disposed adjacent said first flue disk and having a plurality of apertures therein and wherein the apertures of said first and said second flue disks are positionable with respect to one another to control air flow in the air passage;

a cooking grate; and cooking grate support means attached to the top of said burner housing for supporting said cooking grate in a horizontal position over said burner housing, said grate support means establishing a plurality of vertical height positions for said cooking grate.

11. The device of claim 10 wherein said cooking grate support means includes at least three protruding members that extend above said burner housing and wherein said cooking grate includes an inner and an outer concentric ring each disposed in spaced apart planes and a member attached to and disposed between said inner and said outer concentric rings, and a cooking grill attached to said inner concentric ring, and wherein said outer concentric ring includes at least three apertures positioned to receive said at least three protruding members when said cooking grate is rotated into a first position and displaced on said burner housing.

12. The device of claim 11 including a first insulation layer attached to the inner surface of said cylindrical housing and a second insulation layer attached to the outer surface of said burner housing.

13. The device of claim 12 wherein said cooking grill is removably attached to said inner concentric ring and wherein said portable cooking device further includes a cooking vessel having a circular base and cylindrical walls extending upward from said base and wherein the diameter of said cooking vessel is smaller than the inner diameter of said inner concentric ring so that said cooking vessel may be disposed in said inner concentric ring upon removal of said cooking grill.

14. The device of claim 13 wherein said cooking vessel includes a rim having an inner diameter and an outer diameter, and wherein the inner diameter of said rim is attached to the upper edge of said cylindrical walls of said cooking vessel.

15. The device of claim 14 wherein said cooking grate support means are vertical rods extending above the upper surface of said burner housing.

16. The device of claim 15 wherein said burner housing is made from stainless steel alloys.

17. The device of claim 11 including a temperature isolation means including first insulation means disposed on the inner surfaces of said cylindrical housing and second insulation means disposed on the outer surface of said burner housing, and wherein said first insulation means and said second insulation means define the air passage wherein said flue is disposed.

18. The device of claim 17 wherein said cooking grate support means are vertical rods extending above the upper surface of said cylindrical housing.

19. The device of claim 17 wherein said cooking grate support means are rectangular members extending above the upper surface of said cylindrical housing.

20. The device of claim 11 wherein the air flow passage draws air through the apertures of the cylindrical sidewalls, and downwardly through the flue, and then further downwardly, and then through the apertures of the burner housing, and then upwardly through the first grate, to thereby create a counter-flow air passage.

21. The device of claim 11, and further including:

a handle pivotally attached to said burner housing; wherein said burner floor catches ash; and wherein said handle permits removal of said burner housing from said cylindrical housing.

* * * * *